June 21, 1966 C. H. J. BEAVEN 3,257,640
APPARATUS CAPABLE OF INDICATING THE EXTENT OF
HIGHWAY USAGE BY A ROAD VEHICLE
Filed June 25, 1963
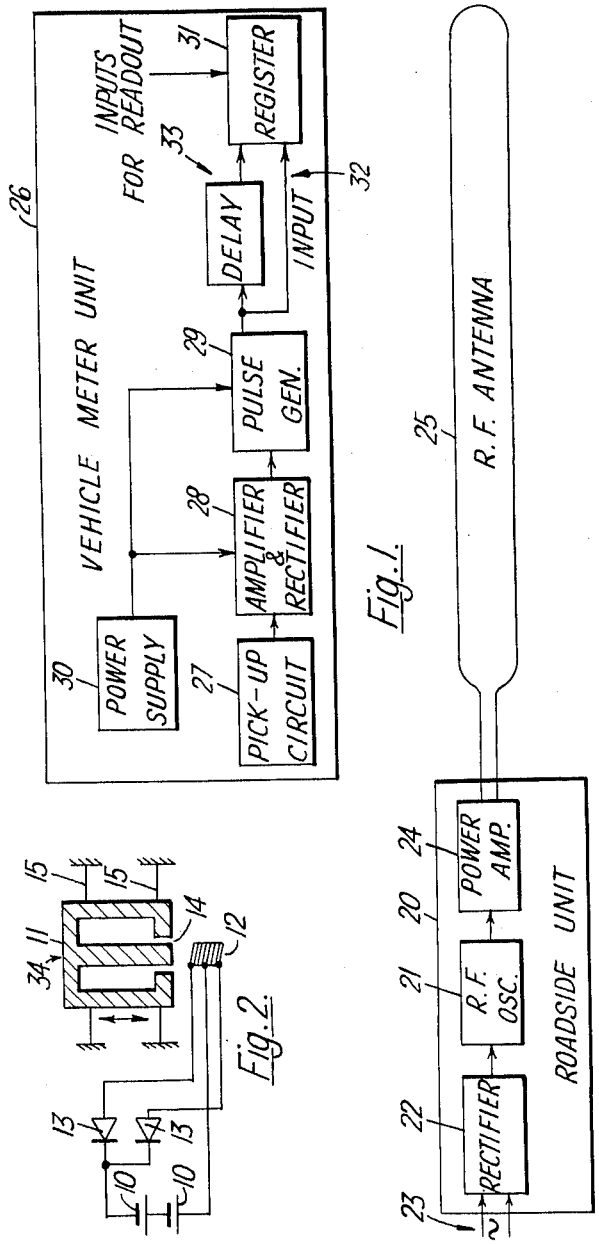
Inventor
CLIFFORD HENRY JAMES BEAVEN
By
Richard G. Stephens Attorney

United States Patent Office 3,257,640
Patented June 21, 1966

---

3,257,640
APPARATUS CAPABLE OF INDICATING THE EXTENT OF HIGHWAY USAGE BY A ROAD VEHICLE
Clifford H. J. Beaven, Aylesbury, Buckinghamshire, England, assignor to General Precision Systems Limited, Aylesbury, Buckinghamshire, England
Filed June 25, 1963, Ser. No. 290,455
Claims priority, application Great Britain, June 25, 1962, 24,377/62
8 Claims. (Cl. 340—32)

This invention is concerned with apparatus for application in the determination of the extent to which a highway system, or a particular road route, is utilised by individual vehicles, thereby making possible the assessment of tolls payable in respect of each vehicle in accordance with that determination.

One suggestion that has been put forward for achieving this end involves the carrying by each vehicle of an electric meter that can be influenced at intervals, either of time or distance covered, by external transmissions from stationary equipment at the roadside or embedded in the road. The primary object of this invention is to render that suggestion feasible as a practical matter.

According to the invention, the electrical meter to be carried by a vehicle includes a pick-up circuit permanently tuned to the external transmissions and a solid-state memory or count register (for example of the magnetic core type), the arrangement being such that in operation the pick-up circuit will respond to successive receptions of the external transmissions by causing the delivery of corresponding successive electrical pulses into the register, from which the cumulative total thereof is subsequently ascertainable.

It is desirable that the device should not depend on power from the vehicle equipment; according to a preferred feature of the invention it includes its own electrical supply means comprising an accumulator and, for charging it, a generator which in operation is driven by fluctuations in its environment, for example in accelerations imposed on it by virtue of the motion of the vehicle.

Each roadside or stationary equipment may comprise a radio frequency power generator supplying a tuned transmitting antenna or aerial loop extending across or along the vehicle highway, and preferably the transmitting loop itself is in the form of a conductor printed or otherwise deposited on flexible tape. This makes installation in a road surface a comparatively simple operation.

One manner of practising the invention is illustrated, by way of example, in the accompanying drawings, of which:

FIGURE 1 is a block diagram of the stationary roadside equipment and a meter, and FIGURE 2 is a diagram showing the essentials of a seismic power supply suitable for incorporation in the vehicle meter of FIGURE 1.

The stationary equipment in FIGURE 1 comprises a roadside box 20 housing a crystal-controlled transistor oscillator that is powered by a rectifier unit connected at 23 to a source of alternating electrical power. The oscillator output is amplified by a power amplifier 24 and delivered to a series-tuned radio frequency loop 25 consisting, for instance, of ten turns of 18 S.W.G. wire or its equivalent in flat tape printed circuit form. The loop may be about one inch wide and twenty-five feet long, something like two watts of radio frequency output at 100 kc./s. being needed to power it.

In printed circuit form the tuned loop 25 can be carried on a flexible base tape of a synthetic material such as polyethylene terephthalate. The length of twenty-five feet is intended to give sufficient to extend across most carriageways and for narrower roads the surplus can be rolled up and stowed in the roadside box. Installation in the road surface is extremely simple, it being possible merely to lay the tape across the road and cover it with a thin layer of surfacing material such as asphalt. If it is desired to give greater protection from eventual damage a channel can be cut in the road material, the tape being laid into this and the channel then filled in.

The meter 26 to be carried by each vehicle is shown as comprising a pick-up network 27, a circuit 28 for amplifying and rectifying the signals received, and an avalanche or breakdown type pulse generator 29 triggered by the rectified signal from the amplifier and powered, as is also the amplifier, by an internal self-contained power supply 30 of the meter, the steep wave-front pulses generated in this way being delivered to a magnetic core memory constituting a solid state count register 31. Whenever the vehicle passes over a tuned R.F. transmission loop in the roadway, such as the loop 25, the signal received by the meter pick-up network 27 initiates the delivery of one pulse to the count register 31. This pulse is however received by the register over two input channels, the first input 32 serving to store the count in the memory while the second input 33 is delayed by about five microseconds and constitutes a stepping or transfer signal to advance the register 31 to the next stage.

The pick-up network 27 includes a pick-up coil in a circuit turned to the transmission frequency. This coil may comprise approximately 150 turns on a ferrite rod about one or two centimetres in diameter and ten centimetres long. The amplifier 28 receiving the signals picked up can be a single stage transistor amplifier.

An example of a suitable internal power supply for incorporation in the meter is illustrated schematically in FIGURE 2 and comprises two nickel/cadmium cells 10 maintained charged by a seismic generator device 34. The latter is the equivalent of a moving-coil loudspeaker unit in which relative axial oscillations of an annular permanent magnet 11 and a centre-tapped coil 12 occur with the motion of the vehicle and cause alternating voltages to appear across the coil. These are rectified by silicon diodes 13 for application to charge the cells 10.

The coil 12 is shown, for clarity, axially withdrawn from the annular magnet gap 14, but in operation it fits in this gap and is fixedly connected to the casing of the generator device, and so to the structure of the meter unit. The magnet 11 is located by flexible spider mountings 15 which enable it to have a degree of axial float and to oscillate with respect to the other parts by virtue of its own mass as the vehicle travels over uneven surfaces.

The transducer need not be a moving coil as shown, but may involve, for example, a mass causing fluctuating pressure on a piezo-electric crystal device. Also, generators for the present purpose may be devised to be operated by environmental fluctuations other than imposed accelerations, for example by variations in the ambient atmospheric pressure on an aneroid capsule.

As to the count register itself, if the binary code is used a count approximately equal to decimal $10^6$ can be achieved using 80 magnetic cores and 80 diodes. The cores may have wires that enable the register to be interrogated and a count read-out obtained through special equipment upon removal of the meter from the vehicle.

The components of a meter as described can readily be encapsulated in a unitary block by potting in an appropriate synthetic resin compound. Besides rendering the meter substantially tamper proof, this makes it almost indestructible under the conditions likely to be met in ordinary use and it will be unaffected by adverse climatic conditions. So it can be carried at a more or less conspicuous place on the exterior of the vehicle where its presence and satisfactory condition can easily be checked. Furthermore, the protected internal circuitry of the block be so arranged that unauthorized attempts to render it inoperative or to reset it merely result in its count altering adversely.

The arrangement of the tuned loop of each roadside box across the carriageway is appropriate to places where traffic moves with reasonable freedom. In this instance the signals received by, and the resulting pulses stored in the meter of, a vehicle depend on distance covered. The toll payable per unit of distance can be varied on different routes merely by changing the spacing of the loops along the highway, so that on routes carrying a higher toll the counters of the vehicle meters are pulsed more frequently.

It may however be more desirable in certain locations, for example in congested city centres, to pulse the vehice meter counters on a time interval basis rather than at distance intervals. This can be achieved by running the transmission loops lengthwise along the carriageways instead of across them, so that each vehicle meter is in arrangement, the R.F. transmission of the loops is not continuous, as in the case of the loops across the carriageway, but is delivered in pulses at the desired timing intervals. Again it is possible to weight the toll more heavily on certain routes, this time by pulsing the loops more frequently, and a further possibility is the changing of the frequency of pulsing on a particular route, for example according to the state of congestion or the time of day.

Loops running lengthwise of the carriageway, used either in succession or individually, will also pulse the meters of vehicles that are parked at the roadside. They therefore provide, if desired, a method of assessing parking charges which can be very flexible, since again the pulsing rate can be varied according to the nature of the road, the state of traffic or the time of day.

It is to be understood that, although the R.F. transmission antennae have been referred to throughout as loops, the conductors embedded in the roadway need not be physically loops but can be, for example, single conductors starting at one roadside box and ending at another.

The system set forth above is much simpler than a data transmission system and also has the advantage that reliable accuracy can be more readily achieved since only counting is involved. Besides simple and cheap installation of the equipment, both at the roadway and on the vehicle, the accounting station to which meters may be taken for assessment of toll charges needs only a simple multiplier to give the total toll. There is no information sorting of any kind.

I claim:

1. An electronic meter adapted for mounting on a motor vehicle and comprising a tuned pick-up circuit delivering a signal output in accordance with external signals received from time to time from stationary transmitter means associated with the roadway along which the vehicle operates, amplifier circuitry receiving and amplifying said signal output of said pick-up circuit, internal self-contained power-generating means generating electrical power which is supplied to said amplifier circuitry, a solid state electronic counter having a pulse signal input, and means applying the amplified signal output from said amplifier circuit in the form of pulses to said pulse signal input of said counter.

2. An electronic meter adapted for mounting on a motor vehicle and comprising a tuned pick-up circuit delivering a signal output in accordance with external signals received from time to time from stationary transmitter means associated with the roadway along which the vehicle operates, amplifier circuitry receiving and amplifying said signal output of said pick-up circuit, pulse-generating means receiving the amplified signal from said amplifier circuitry and delivering a corresponding output in the form of electrical pulses, internal self-contained power-generating means generating electrical power which is supplied to said amplifier circuitry and said pulse-generating means, a solid state electronic counter having a pulse signal input, and means applying the electrical pulse output of said pulse-generating means to said pulse signal input of said counter.

3. A meter according to claim 2, wherein said power-generating means comprises an accumulator, and an electrical generator connected in charging relationship to said accumulator, said generator being operated by fluctuations in an environmental condition to which it is subjected.

4. A meter according to claim 3, wherein said generator is driven by accelerations imposed on it by virtue of the motion of the vehicle.

5. A meter according to claim 2, wherein said counter comprises a register having a shift input and a count store input, and the output of said pulse-generating means is applied directly to said count store input and also through delay means to said shift input.

6. The combination of a plurality of vehicle-mounted meters according to claim 1, with a plurality of stationary transmitters positioned at different specific locations along a roadway.

7. The combination according to claim 6, wherein each transmitter includes a loop antenna extending transversely across the roadway.

8. The combination of a plurality of vehicle-mounted meters according to claim 1, with at least one stationary transmitter positioned at the roadside and having a loop antenna extending along the roadways.

References Cited by the Examiner

UNITED STATES PATENTS 2,883,108  4/1959  Thornton _____ 340—38
3,115,622  12/1963  Jaffe _____ 179—82

DAVID G. REDINBAUGH, *Primary Examiner.*

J. W. CALDWELL, *Assistant Examiner.*